United States Patent [19]
Meyers et al.

[11] Patent Number: 5,758,027
[45] Date of Patent: May 26, 1998

[54] APPARATUS AND METHOD FOR MEASURING THE FIDELITY OF A SYSTEM

[75] Inventors: Martin Howard Meyers, Montclair; Ahmed A. Tarraf, Bayonne; Carl Francis Weaver, Hanover Township, Morris County, all of N.J.

[73] Assignee: Lucent Technologies Inc., Murray Hill, N.J.

[21] Appl. No.: 520,191

[22] Filed: Aug. 28, 1995

Related U.S. Application Data

[63] Continuation-in-part of Ser. No. 370,917, Jan. 10, 1995.
[51] Int. Cl.$^6$ .................... G06E 1/00; G06F 15/18
[52] U.S. Cl. .................... 395/21; 395/24; 704/259
[58] Field of Search .................... 381/41, 49, 51, 381/24, 59, 97, 98, 103; 895/2, 23, 21, 22; 364/379, 378; 704/259

[56] References Cited

U.S. PATENT DOCUMENTS

| | | | |
|---|---|---|---|
| 5,179,624 | 1/1993 | Amano et al. | 395/2 |
| 5,550,543 | 8/1996 | Chen et al | 341/94 |

OTHER PUBLICATIONS

"Objective Quality Evaluation for Low–Bit–Rate Speech Coding Systems", N. Kitawaki, H. Nagabuchi and K. Itoh, IEEE J. On Selected Areas in Communications, vol. 6, No. 2, Feb. 1988, pp. 242–248.

"Use of Objective Speech Quality Measures in Selecting Effective Spectral Estimation Techniques for Speech Enhancement", John H. L. Hansen and Mark A. Clements, 1990 IEEE, pp. 105–108.

"An Objective Measure for Predicting Subjective Quality of Speech Coders", Shihua Wang, Andrew Sekey and Allen Gersho, IEEE J. On Selected Areas in Communications, vol. 10, No. 5, Jun. 1992, pp. 819–829.

"A Perceptual Audio Quality Measure Based on a Psychoacoustic Sound Representation", John G. Beerends and Jan A. Stemerdink, J. Audio Eng. Soc., vol. 40, No. 12, 1992 Dec., pp. 963–978.

"Advances in Objective Voice Quality Assessment", R. Kubichek and D. Atkinson and A. Webster, 1991 IEEE, Globecom '91, pp. 1765–1770.

"Constraints of Filter Banks Used for Perceptual Measurement", Thomas Sporer and Karlheinz Brandenburg, J. Audio Eng. Soc., vol. 43, No. 3, 1995 Mar., pp. 107–116.

"Perceval: Perceptual Evaluation of the Quality of Audio Signals", B. Paillard, P. Mabilleau, S. Morissette and Joel Soumagne, J. Audio Eng. Soc., vol. 40, No. 1/2, 1992 Jan./Feb., pp. 21–31.

Sage et al. "Estimation Theory with Applications to Communications and Control," McGraw–Hill, Inc., Dec. 31, 1971.

Wang et al. "Auditory Distortion Measure for Speech Coding," ICASSP '91: Acoustics, Speech & Signal Processing Conf., pp. 493–496.

ITT, "Reference Data for Radio Engineers, 5th ed." Howard W. Sams & Co., pp. 44–39–44–40, Mar. 31, 1970.

Primary Examiner—Tariq R. Hafiz

[57] ABSTRACT

A fidelity measuring apparatus (103). The fidelity measuring apparatus (103) measures the fidelity of a system (101). A preprocessor (109) receives an input signal. The preprocessor (109) also receives an output signal from the system (101). The preprocessor (109) extracts a feature set from the output signal. An artificial intelligence tool (111), trained in the relationship between fidelity and the feature set, generates an output that is a measure of the fidelity of the system (101). A fidelity measuring apparatus (103b) includes a preprocessor (138) and two or more artificial intelligence tools (111-N). The artificial intelligence tools (111-N) are independently trained by input signals from different sources. An averaging circuit (140) averages the output of each artificial intelligence tool (111-N). The fidelity measuring apparatus (103b) operates to produce accurate fidelity measurements independent of the input signal, the source of the input signal and the technology of the system.

17 Claims, 5 Drawing Sheets

APPARATUS AND METHOD FOR MEASURING THE FIDELITY OF A SYSTEM

CROSS REFERENCE TO RELATED APPLICATIONS

This application is a continuation-in-part of copending U.S. patent application Ser. No. 08/370,917, filed Jan. 10, 1995, and entitled Method and Apparatus for Characterizing an Input Signal, which application is incorporated by reference.

FIELD OF THE INVENTION

This invention relates to systems analysis in general, and, more particularly, to an apparatus and method for measuring the fidelity of a system.

BACKGROUND OF THE INVENTION

Many systems are designed to process signals in such a manner that the output is a substantially undistorted representation of the input. An example is the telephone system, which is designed to transport a sound from the speaker to the listener without changing the character of the sound.

The extent to which a system can process signals without introducing distortion is referred to as the "fidelity" of the system, and engineers continually strive to improve, subject to economic considerations, the fidelity of their systems. It is difficult to develop a meaningful and objective measure of the fidelity, however, for two reasons. First, it is difficult to develop a meaningful measure because there are so many ways in which the distortion can be statistically analyzed and it is not always clear which is the most meaningful. Second, for systems that process "sensorial signals" (i.e., signals that are ultimately intended to stimulate the senses, e.g., audio and video signals), some distortions are perceptible and others are not. Thus, the subjective complexities of human perception further hinder the reliability of an objective measure of fidelity.

To date, the most meaningful tests of fidelity for sensorial signals rely on human testing, but such tests are typically expensive and time consuming. For example, one testing regimen, known as the Mean Opinion Score ("MOS") test, typically uses 44 people and can take months to complete. Furthermore, one exercise of the test can cost tens of thousands of dollars. Thus, there has been a long felt need for a faster and less expensive method for reliably measuring the fidelity of an system.

SUMMARY OF THE INVENTION

An exemplary embodiment of the present invention measures the fidelity of a system without many of the costs and disadvantages associated with methods in the prior art. For the purposes of this specification, the term "system" means a device or devices that transforms, processes and/or transports an input signal in some palpable way to produce an output signal. In one embodiment of the present invention, a fidelity measuring apparatus extracts a feature from an output signal that correlates to the fidelity of the system. At least two artificial intelligence tools process the extracted feature, which tools have been previously trained in a relationship between fidelity and the extracted feature. An averaging circuit averages the outputs of the two artificial intelligence tools to produce a fidelity measurement.

Advantageously, the fidelity measuring apparatus operates independently of the specific input signals that are used in training the artificial intelligence tools. Once trained, the fidelity measuring apparatus can accurately measure the fidelity of a system even if the input signal applied to the system is different from that used to train the artificial intelligence tools.

In another embodiment, the present invention provides a method for manufacturing, using fidelity measuring apparatus, a plurality of devices incorporating a system. First, an engineer produces an initial design for the system and then measures its fidelity with the fidelity measuring apparatus. Based on the fidelity measurements, the engineer modifies the design of the system. The engineer then iteratively measures the fidelity of the modified system and modifies the design until an acceptable degree of fidelity is achieved. Then, the system is incorporated into the devices.

BRIEF DESCRIPTION OF THE DRAWING

For a more complete understanding of the present invention and the advantages thereof, reference is now made to the following description taken in conjunction with the accompanying drawings in which like reference numbers indicate like features and wherein.

DETAILED DESCRIPTION

Figure 1:
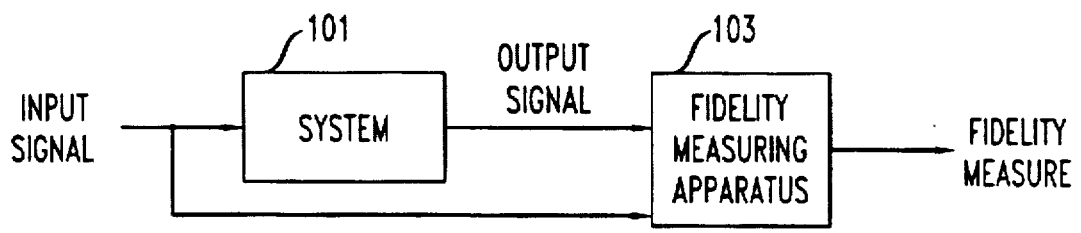
FIG. 1 is a block diagram of a fidelity measuring apparatus coupled to a system according to the teachings of the present invention.

In FIG. 1, fidelity measuring apparatus 103 is coupled to measure the fidelity of system 101. System 101 receives an input signal and outputs an output signal that is either a transformed, processed and/or transported replica of the input signal. Fidelity measuring apparatus 103 receives both the input signal and the output signal. It is noted that the input signal can be either analog or digital. If the input signal and the output signal are analog, fidelity measuring apparatus 103 may need to convert the input and output signals to digital signals before processing.

In operation, fidelity measuring apparatus 103 measures or tests the fidelity of system 101, for example, during a design process. This can greatly reduce the time and expense associated with the human tests used in the design of such systems. A designer generates a proposed design for system 101. The designer provides a test or input signal to system 101 and fidelity measuring apparatus 103. System 101 provides an output signal to fidelity measuring apparatus 103. Fidelity measuring apparatus outputs a measure of the fidelity of system 101. The designer uses the output of fidelity measuring apparatus 103 to generate a modified design of system 101. The designer repeats the steps of modifying and measuring the fidelity until an acceptable measurement is achieved. When an acceptable fidelity measurement is achieved, system 101 can then be incorporated into, for example, a telecommunications device such as a wireless terminal or base station.

The telecommunications industry, among others, relies heavily on human testing to assess the fidelity of a system. For example, some telephones digitally encode and compress voice signals before transmission and then decode and reconstitute the voice signal after transmission. This technique is generally known as "voice coding," and it is well understood that voice coding can unacceptably distort a voice signal. The engineers who design voice coding systems, which systems are commonly known as "vocoders," usually endeavor to incorporate fidelity testing into the design of prototypes as part of the effort to design better vocoders.

Figure 2A:
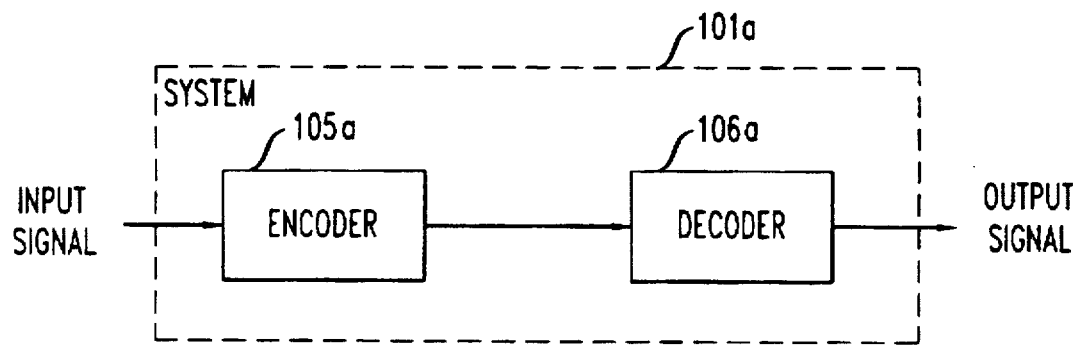
FIGS. 2a through 2d are block diagrams of exemplary systems to be coupled to the fidelity measuring apparatus of FIG. 1.

Vocoder 101a of FIG. 2a is an example of a system that can be tested with fidelity measuring apparatus 103 of FIG. 1. Vocoder 101a includes encoder 105a and a corresponding decoder 107a. Encoder 105a may be incorporated into a transmission circuit of a base station or a wireless terminal. Similarly, decoder 105a may be incorporated into a receive circuit of a wireless terminal or a base station. Vocoder 101a outputs a signal that is a conditioned version of the input signal. For test purposes, encoder 105a and decoder 107a may be from the same wireless terminal or the same base station.

Figure 2B:
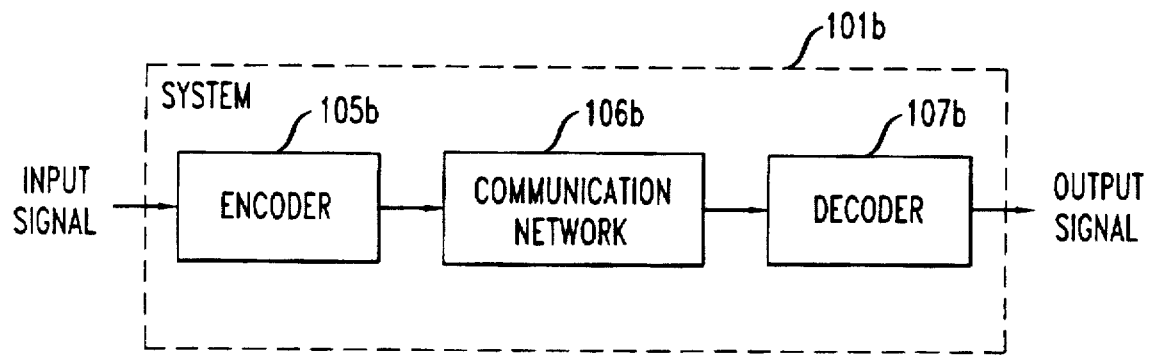
Figure 2C:
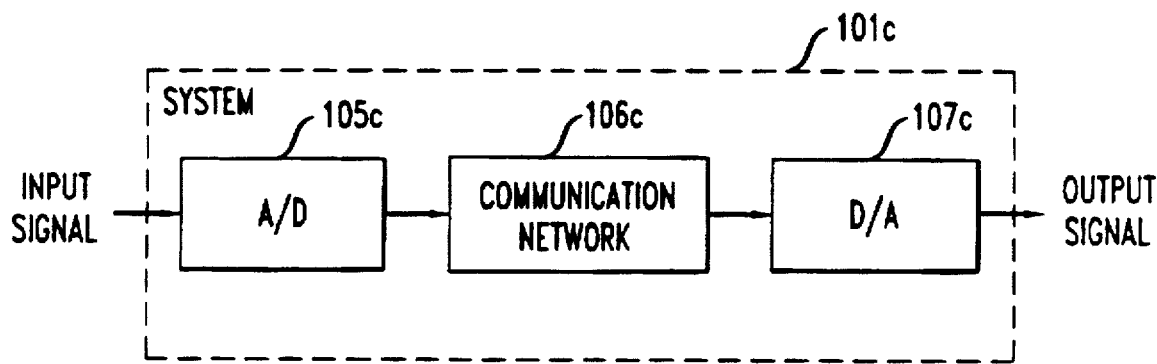
Figure 2D:
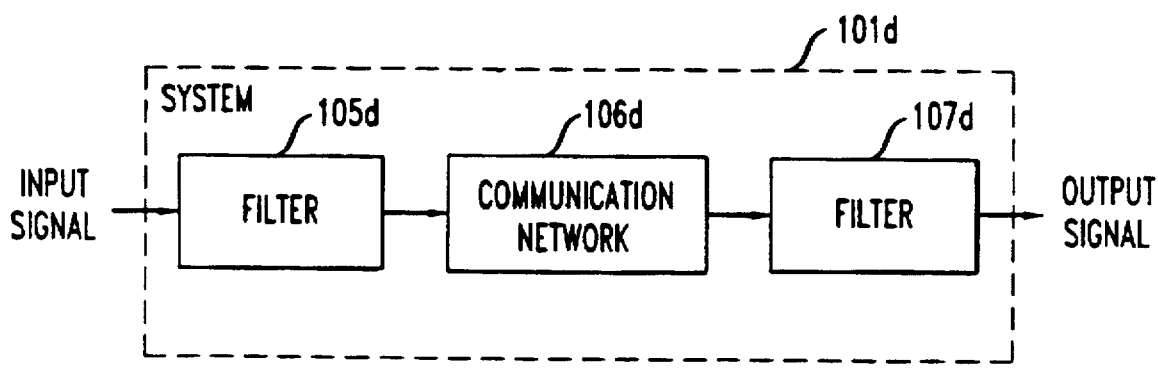

Other systems that transform, process and/or transport a signal may be tested with fidelity measuring apparatus 103. FIGS. 2b through 2d illustrate various systems used in, for example, telecommunications. System 101b of FIG. 2b comprises encoder 105b coupled to matched decoder 107b through communication network 106b. Communication network 106b may comprise, for example, a public switched telephone network ("PSTN"), a wireless network, or a combination of a PSTN and a wireless network. FIG. 2c illustrates system 101c, which represents a type of digital transmission circuit. System 101c comprises analog-to-digital converter 105c, communication network 106c and digital-to-analog converter 107c. System 101d of FIG. 2d represents an analog transmission circuit. System 101d comprises filter 105d, communication network 106d and filter 107d. Systems 101a through 101d are shown as examples of system 101 and should not be interpreted as limitations. System 101 of FIG. 1 is not limited to telecommunications circuits. System 101 may comprise any apparatus that transforms, processes and/or transports an input signal.

Figure 3:
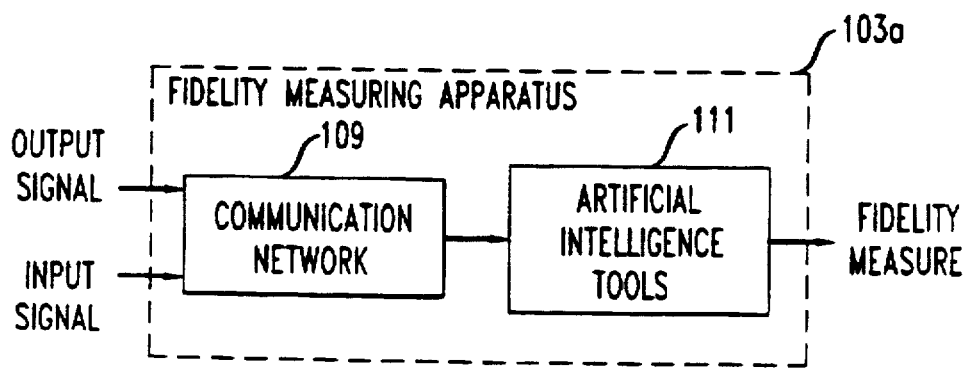
FIG. 3 is a block diagram of an embodiment of the fidelity measuring apparatus of FIG. 1 according to the teachings of the present invention.

FIG. 3 depicts a block diagram of an illustrative embodiment of the present invention. Fidelity measuring apparatus 103a advantageously comprises preprocessor 109 and artificial intelligence tool 111. Preprocessor 109 receives two input signals, namely the input signal and the output signal from system 101. Preprocessor 109 provides the input to artificial intelligence tool 111.

In operation, preprocessor 109 extracts a "feature set" from the output signal. A "feature" of the output signal is a characteristic of the signal that correlates to the fidelity of system 101. A "feature set" is two or more data points for the feature. For example, as described more fully below with respect to FIG. 4, the feature set may comprise the spectral distortion of the output signal for each of a plurality of bands over the ear-critical frequency range. Alternatively, any appropriate feature of the output signal can be used if the feature correlates to the fidelity of system 101. Use of preprocessor 109 in this embodiment according to the teachings of the present invention advantageously reduces the amount of data to be processed by artificial intelligence tool 111. For example, if the input signal is a 16 bit linear quantization sampled at 8 KHz, preprocessor 109 can reduce the data rate from 125 kbits/s input into preprocessor 109 to approximately 36 bits/s output to artificial intelligence tool 111 for speech signals of 8 seconds in length. Furthermore, preprocessor 109 removes extraneous information from the output signal that can degrade the ability of artificial intelligence tool 111 from converging on an accurate measurement of the fidelity of system 101.

Artificial intelligence tool 111 produces an output signal that corresponds to the fidelity of system 101 from the feature set extracted by preprocessor 109. Artificial intelligence tool 111 is trained in the relationship between feature sets and fidelity measurements based on empirical studies. Artificial intelligence tool 111 may comprise a neural network as described below with respect to FIG. 5. A neural network employs plural processing elements interconnected such that the network simulates higher order mental functioning. Artificial intelligence tool 111 may also comprise any other appropriate system capable of adaptive learning such as an expert system, fuzzy logic, or intelligent statistical method.

Figure 4:
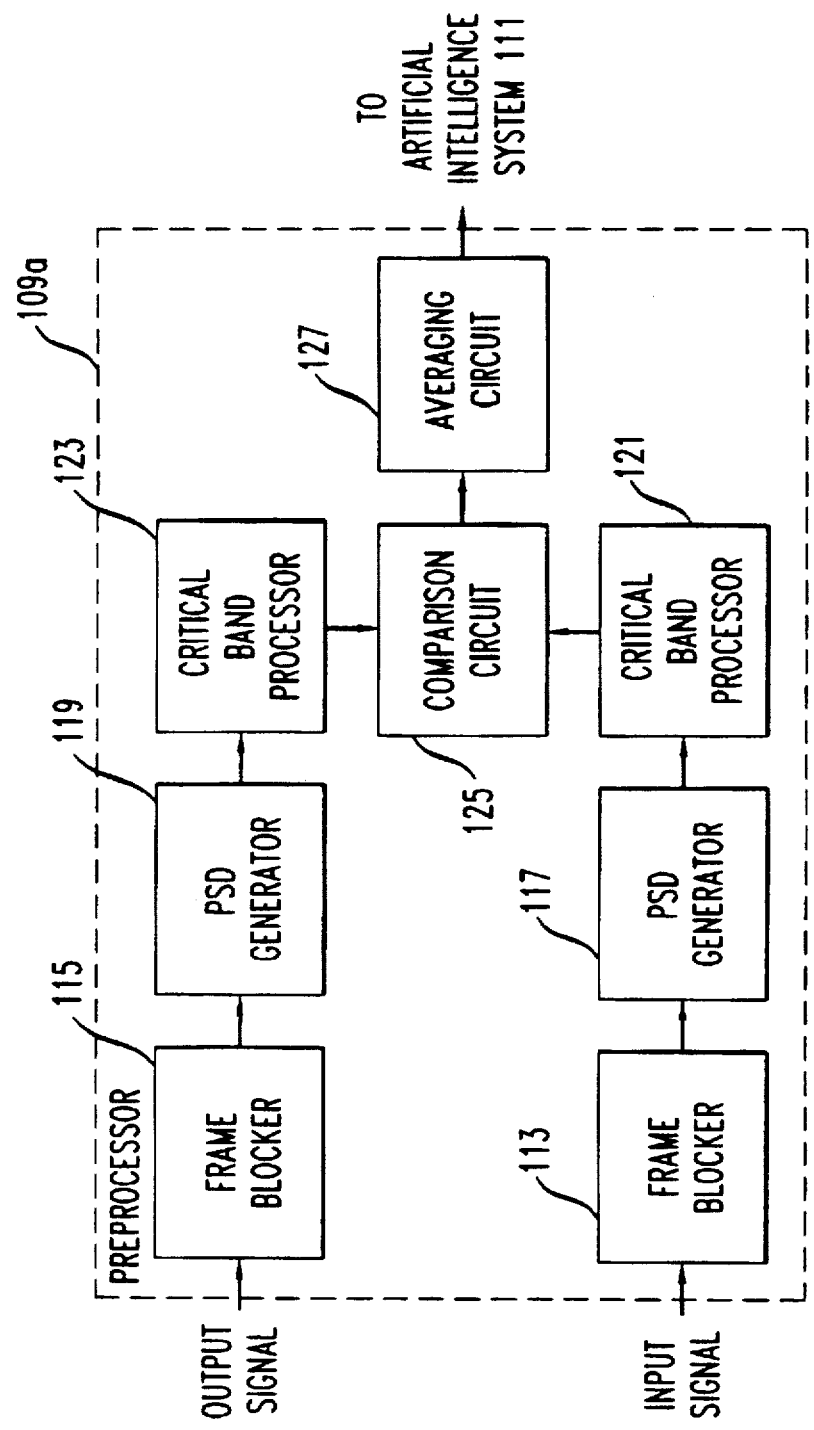
FIG. 4 is a block diagram of an embodiment of the preprocessor of FIG. 3 according to the teachings of the present invention.

FIG. 4 is a block diagram of an embodiment of a preprocessor indicated generally at 109a and constructed according to the teachings of the present invention. Preprocessor 109a advantageously operates on a voice signal that has been transformed by a telecommunications circuit such as, for example, a vocoder. Preprocessor 109a may also operate on other appropriate signals transformed by other appropriate systems 101. Preprocessor 109a extracts a feature set that relates to, for example, the power spectral distortion of an output signal. Alternatively, the feature set may be based on a Bark transform (power spectral distortion in the Bark domain), an ensemble interval histogram (EIH) model, an information index model, a mathematical model of the human auditory system or a combination thereof. Basing the feature set on more than one parameter increases the robustness of fidelity measuring apparatus 103.

Preprocessor 109a separately processes the input signal and the output signal with corresponding operations. First, preprocessor 109a receives the input signal and the output signal at frame blockers 113 and 115, respectively. Frame blockers 113 and 115 provide input to power spectral density (PSD) generators 117 and 119, respectively. Finally, PSD generators 117 and 119 provide input to critical band processors 121 and 123, respectively. Comparison circuit 125 is coupled to critical band processors 121 and 123. Comparison circuit 125 is coupled to an averaging circuit 127 that provides the output of preprocessor 109a.

In operation, preprocessor 109a extracts a feature set that relates, for example, to the power spectral distortion of the output signal. Preprocessor 109a extracts the feature set based on a difference between the power spectral density of the output signal as compared to the input signal. Preprocessor 109a operates over a short time interval on the order of 5 to 25 milliseconds. During such a short time interval, it can be assumed that the original voice signal is time invariant or quasi-stationary. This assumption is important because parameter estimation is more difficult in time-varying systems. With voiced speech, the input signal is assumed to be time-invariant for a 20 millisecond interval. Physically, this means that the voice tract remains substantially constant over this time interval. Thus, preprocessor 109a extracts the feature set for artificial intelligence tool 111 from data generated during a short time interval of the input signal.

First, frame blockers 113 and 115 block the input signal and the output signal, respectively, into M non-overlapping frames with N samples per frame. The number of frames M depends on the duration of the input signal. Additionally, the number of samples N depends on the duration and frequency of the input signal. Thus the output of each frame blocker 113 and 115 may be represented as a matrix having M rows with N columns.

PSD generators 117 and 119 generate the power spectral density for each frame of data from frame blockers 113 and 115, respectively. The power spectral density for each frame is computed using the Fast Fourier Transform according to the following equations for frame i in signals X and Y, respectively:

$$P_X(i) = \frac{|fft(X(i,1:N),N)|^2}{N} ; \text{ and} \quad (1)$$

$$P_Y(i) = \frac{|fft(Y(i,1:N),N)|^2}{N} . \quad (2)$$

In equations (1) and (2), fft(a,b) denotes the Fast Fourier Transform. Additionally, the input and output signals are labelled X and Y. The signals X and Y are digital signals that have N elements for each frame i. Thus, signals X and Y are denoted as vector quantities, e.g. X(i,1:N), where i is the frame number, and 1:N indicates there are N elements. The power spectral density according to equations (1) and (2) are calculated for each frame i for i equal from 1 to M. In general, the power spectral density for each frame is an array of N elements representing the power spectral density over a frequency range.

Critical band processors 121 and 123 limit the power spectral density to a critical frequency range. This recognizes the fact that the human auditory system is known to have poorer discrimination at high frequencies. Additionally, a peripheral auditory analysis model by critical band filters has been developed based on observations relating to high frequency discrimination and masking of tones by noise. The model postulates that sounds are preprocessed by critical band filters, with center frequency spacing and bandwidths that increase with frequency. These filters may be viewed as the tuning curves of auditory neurons. Table 1 below provides a set of approximations based on this model of measured critical bands.

TABLE 1

| A Model of Critical Measured Bands | | | |
|---|---|---|---|
| Critical Band Number | Center Frequency (Hz) | Critical Band (Hz) | Lower Cutoff Frequency (Hz) | Upper Cutoff Frequency (Hz) |
| 1 | 50 | — | — | 100 |
| 2 | 150 | 100 | 100 | 200 |
| 3 | 250 | 100 | 200 | 300 |
| 4 | 350 | 100 | 300 | 400 |
| 5 | 450 | 110 | 400 | 510 |
| 6 | 570 | 120 | 510 | 630 |
| 7 | 700 | 140 | 630 | 770 |
| 8 | 840 | 150 | 770 | 920 |
| 9 | 1000 | 160 | 920 | 1080 |
| 10 | 1170 | 190 | 1080 | 1270 |
| 11 | 1370 | 210 | 1270 | 1480 |
| 12 | 1600 | 240 | 1480 | 1720 |
| 13 | 1850 | 280 | 1720 | 2000 |
| 14 | 2150 | 320 | 2000 | 2320 |
| 15 | 2500 | 380 | 2320 | 2700 |
| 16 | 2900 | 450 | 2700 | 3150 |
| 17 | 3400 | 550 | 3150 | 3700 |
| 18 | 4000 | 700 | 3700 | 4400 |
| 19 | 4800 | 900 | 4400 | 5300 |
| 20 | 5800 | 1100 | 5300 | 6400 |

Since the maximum frequency component of a voice signal is 4 kHz, critical band processors 121 and 123 filter out bands 19 and 20 identified in Table 1. It is noted that for other signals, a different range of frequency bands may be processed. For example, with audio signals, bands up to 8 kHz may be required. Critical band processors 121 and 123 further determine the power spectral density for each of the critical bands for each of the frames. The power spectral density for a band b of a frame i of signal X or Y, respectively, is given by:

$$P_X(i,b) = \sum_{fb} P_X(i); \text{ and} \quad (3)$$

$$P_Y(i,b) = \sum_{fb} P_Y(i). \quad (4)$$

The elements of the power spectral density associated with frequencies within a band b are summed together to generate the power spectral density for the band b in each frame i. This is indicated by the term fb under the summation symbol. Thus, the output of each critical band processor 121 and 123 is one data point for each band b for each frame i.

Comparison circuit 125 computes a "signal to noise ratio" (SNR) for each band for each frame. The term SNR is used here based on the manner in which comparison circuit 125 compares the output signal to the input signal. This comparison is summarized in the following equation:

$$SNR(i,b) = 10\log\left|\frac{P_X(i,b)}{P_X(i,b) - P_Y(i,b)}\right|. \quad (5)$$

This is a "signal to noise ratio" because the bottom term represents the difference between the power spectral density for the original and output signals—the "noise"—and the top term represents the original "signal". Hence, comparison circuit 125 computes the SNR for system 101. The SNR is also referred to as the "power spectral distortion." Averaging circuit 127 averages the SNR for corresponding bands b of each frame i so as to produce one output SNR for each critical band b. This data is applied to artificial intelligence tool 111. It is noted that, for a 16 bit voice signal sampled at 8 KHz over an 8 second duration, preprocessor 109a receives approximately 1000 kbits. Additionally, preprocessor 109a outputs only 288 bits (18 bands times 16 bits per band) to artificial intelligence tool 111.

Figure 5:
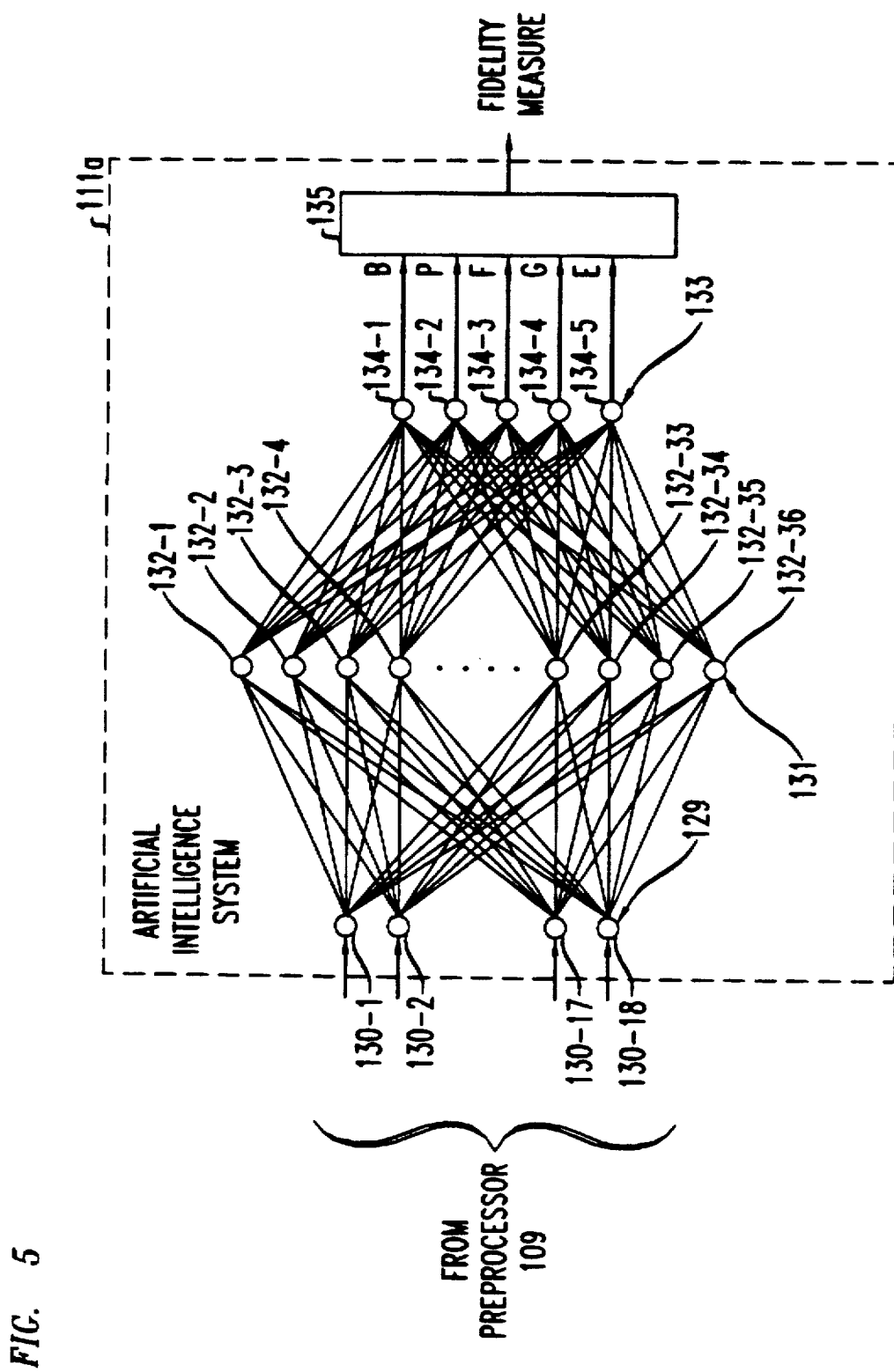
FIG. 5 is a block diagram of an embodiment of the artificial intelligence tool of FIG. 3 according to the teachings of the present invention.

FIG. 5 is a block diagram of an embodiment of an artificial intelligence tool 111a. In one embodiment, artificial intelligence tool 111a comprises a neural network known as a multilayer perceptron. Artificial intelligence tool 111a has three layers of "nodes" or "neurons". Input layer 129 receives the feature set from preprocessor 109 at neurons 130-1 through 130-18. In this embodiment, input layer 129 includes 18 neurons, one neuron for each critical band processed by preprocessor 109a of FIG. 4. For clarity in the drawing, only neurons 130-1, 130-2, 130-17 and 130-18, are shown. It is understood that the number of neurons in layer 129 may be varied to correspond to the output of preprocessor 109. A second layer 131 comprises 36 neurons 132-1 through 132-36. Finally, an output layer 133 comprises neurons 134-1 through 134-5. Neurons 132-1 through 132-36 pass data between input layer 129 and output layer 133. Second layer 131 is referred to as a "hidden" layer. A hidden layer is a layer of neurons that is intermediate input and output layers. Neurons 132-1 through 132-36 and neurons 134-1 through 134-5 include sigmoid activation functions. Alternatively, linear, hard limit or tanh activation functions can be used. It is noted that the three layers of FIG. 5 are shown by way of example and not by way of limitation. Additional hidden layers may be added as necessary such that artificial intelligence tool 111a produces an accurate output. Additionally, the number of neurons in each layer may be varied as needed. As shown in FIG. 5, each neuron in layers 129, 131, and 133 are coupled to each neuron in each adjacent layer. Artificial intelligence tool 111a weights the connections appropriately during training so as to produce an accurate output.

Neurons 134-1 through 134-5 are coupled to a combiner 135 that produces the output of artificial intelligence tool 111a. Neurons 134-1 through 134-5 are labeled B, P, F, G, and E, respectively. These labels correspond to the five possible responses for a traditional MOS test: B for bad, P for poor, F for fair, G for good and E for excellent. Thus, the output of each neuron 134-1 through 134-5 corresponds to the number of listeners in a group that would chose the associated response.

In operation, artificial intelligence tool 111a measures the fidelity of a system 101 based on the input feature set from preprocessor 109. Artificial intelligence network 111a is first trained in the relationship between input feature set and the output fidelity measurement. During training, artificial intelligence tool 111a adjusts the weights associated with each connection between neurons in adjacent layers based on errors in expected output. After training, artificial intelligence tool 111a may be used in, for example, a system as described below with respect to FIG. 6 to measure the fidelity of a system.

Artificial intelligence tool 111a is trained with empirical data from standard MOS tests. Artificial intelligence tool 111a receives feature sets for transformed speech signals from preprocessor 109 and the results of the testing for that transformed speech signal. A large number of speech signals may be applied successively to artificial intelligence tool 111a through preprocessor 109. In training, the output signals are advantageously transformed by a variety of systems under a variety of conditions. For example, the output signals may be conditioned by a variety of vocoders with varying Carrier to Interference (C/I) ratios.

Artificial intelligence tool 111a is trained using several procedures. It is noted that these procedures are described by way of example and not by way of limitation. Other appropriate procedures that train artificial intelligence tool 111a to accurately measure the fidelity of a system may also be used. In one embodiment, artificial intelligence tool 111a is trained with an error backpropagation procedure, enhanced with momentum and adaptive learning rate procedures.

In error backpropagation, upon receiving values from input layer 129, neurons 132-1 through 132-36 in hidden layer 131 each calculate the weighted sum of the values from input layer 129 plus any threshold value. Each neuron 132-1 through 12-36 also multiplies this quantity by an appropriate activation function to produce an output. Neurons 132-1 through 132-36 also provide these outputs to neurons 134-1 through 134-5 of output layer 133. Neurons 134-1 through 134-5 each calculate the weighted sum of the output from neurons 132-1 through 132-36 plus any threshold value. Each neurons 134-1 through 134-5 also multiplies this quantity by an appropriate activation function. During training, an expected value is provided to each output neuron 134-1 through 134-5. Each neuron 134-1 through 134-5 determines a difference between the weighted sum of the values provided by hidden layer 131 and the expected value. Based on the difference, each neuron 134-1 through 134-5 in output layer 133 determines whether the weights of the connections with hidden layer 131 need to be increased or decreased. Neurons 134-1 through 134-5 in output layer 133 propagate the error back to hidden layer 131. Hidden layer 131 likewise adjusts the weights of the connections with input layer 129. Thus, error backpropagation allows artificial intelligence tool 111a to respond to the local gradient or difference between the target and the actual output. Since all the weights are adjusted equally, appropriate weights are generally obtained after many iterations.

The momentum procedure allows artificial intelligence tool 111a to learn from recent trends in the error surface. Acting like a low pass filter, momentum allows artificial intelligence tool 111a to ignore small features in the error surface. Without momentum, artificial intelligence tool 111a can become trapped in a shallow local minimum. With momentum, the network avoids becoming trapped in such a local minimum, thus assisting convergence of each weight to an appropriate value.

The adaptive learning procedure further enhances the training of artificial intelligence tool 111a. First, the initial output and error for artificial intelligence network 111a are calculated. At each iteration, new weights and biases are calculated using the current learning rate. Next, artificial intelligence tool 111a then calculates a new output and error. If the new error exceeds the old error by more than a ratio, the new weights, biases, output and error are discarded and the learning rate is decreased. Otherwise, the new weights, biases, output and error are maintained. If the new error is less than the old error, the learning rate is increased. This procedure increases the learning rate but only to the extent that artificial intelligence tool 111a can learn without large increases in error. The teachings of R. H. Nielson, *Neurocomputing* (Addison-Wesley 1990) are incorporated by reference.

Neurons 130-1 through 130-18 of input layer 129 each receive one value from the feature set from preprocessor 109. The input and output of input layer 129 are the same. Neurons 130-1 through 130-18 each pass the received values to each neuron 132-1 through 132-36 in hidden layer 131. Each neuron 132-1 through 132-36 in hidden layer 131 sums the values from each neuron 130-1 through 130-18 according to the weight associated with the connection to the neuron plus any threshold value. Each neuron 132-1 through 132-36 also multiplies the calculated quantity by an activation function. Hidden layer 131 similarly passes the sums to output layer 133. Each neuron 134-1 through 134-5 of output layer 133 sums the values passed from hidden layer 131 according to the weight associated with the connection between the neurons plus any threshold value. Each neuron 134-1 through 134-5 also multiplies its calculated quantity by an activation function. Combiner 135 combines the values at output layer 133 to produce, for example, an MOS output according to the following equation:

$$MOS = \frac{B + 2P + 3F + 4G + 5E}{B + P + F + E + G} \qquad (6)$$

In equation (6), the weights in the numerator correspond to the points for each type of response (Bad, Poor, Fair, Good, and Excellent) for a traditional MOS test. Thus, artificial intelligence tool 111a produces an output that is a measure of the MOS or fidelity of the system.

Figure 6:
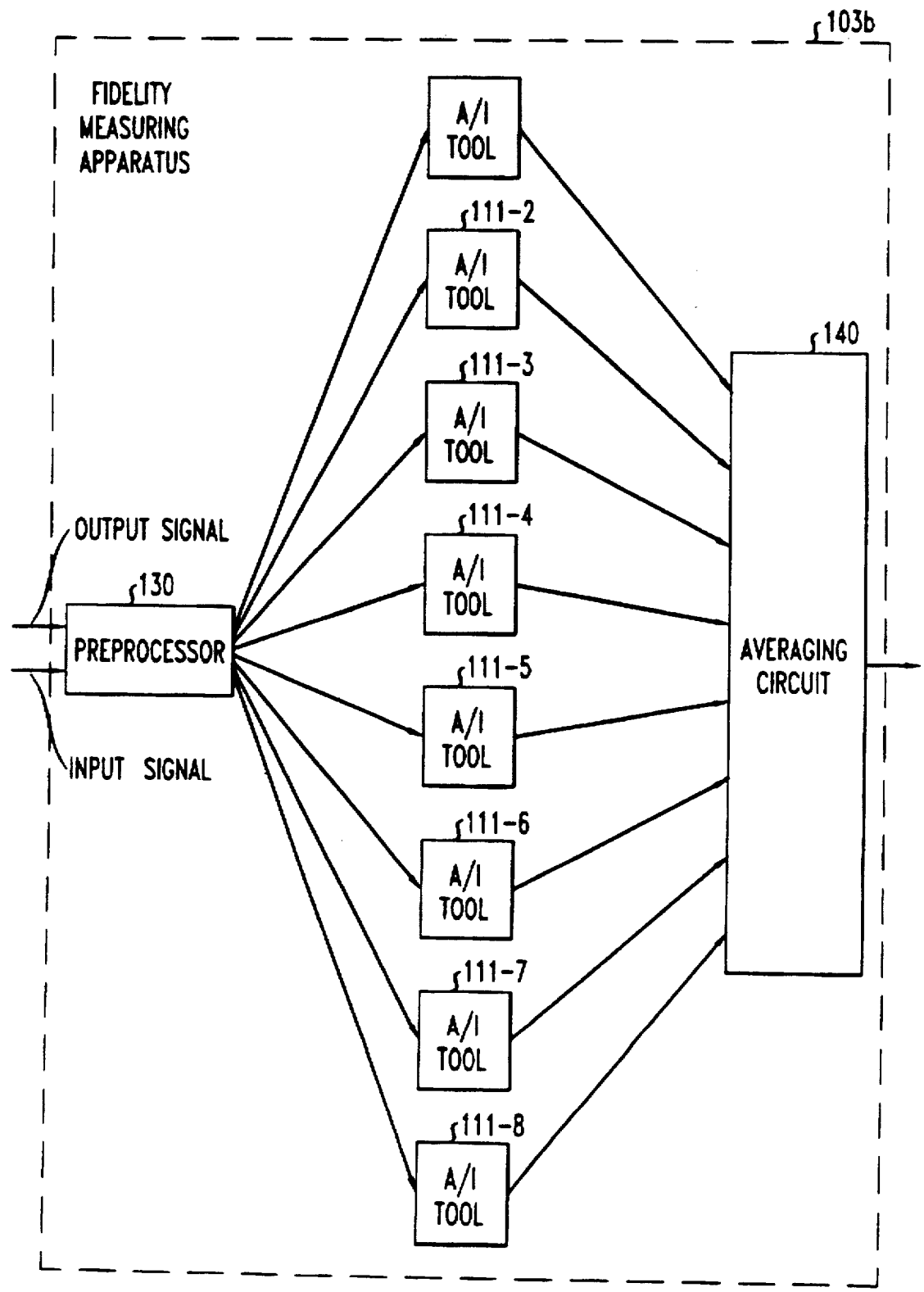
FIG. 6 is a block diagram of another embodiment of a fidelity measuring apparatus according to the teachings of the present invention.

FIG. 6 depicts another embodiment of a fidelity measuring apparatus 103b. Apparatus 103b comprises eight artificial intelligence tools 111-1 through 111-8 that are independently trained as described below. It is noted that the number of artificial intelligence tools may be varied as appropriate for a specific application. A preprocessor 130 provides a feature set to each of artificial intelligence tools 111-1 through 111-8. Preprocessor 130 receives an output signal and an input signal from a system (not shown). Each artificial intelligence tool 111-1 through 111-8 is coupled to an averaging circuit 140. Averaging circuit 140 provides the output of apparatus 103b.

Each artificial intelligence tool 111-1 through 111-8 is advantageously trained by voice signals from one individual. In the embodiment of FIG. 6, eight individuals generate data with various systems to be used in training artificial intelligence tools 111-1 through 111-8. Furthermore, artificial intelligence tools 111-1 through 111-8 are preferably trained by four female speakers and four male speakers such that each speaker is used to train just one of artificial intelligence tools 111-1 through 111-8. For example, a speech signal from a first speaker may be used to train artificial intelligence tool 111-1. The original and conditioned speech signals from the first speaker are applied to preprocessor 138 and multiplexed only to artificial intelligence tool 111-1. The first speaker provides sufficient speech signals to artificial intelligence tool 111-1 until it is trained in the relationship between fidelity and a feature of the speech signal independent of the system. Similarly, data from a second through an eighth speaker are multiplexed to artificial intelligence tools 111-2 through 111-8, respectively, to train these systems.

In operation, apparatus 103b measures the fidelity of a system independent of the system technology, original speech signal and the source of the original speech signal (the speaker). Apparatus 103b receives an output signal and an input signal at preprocessor 138. The source of the input signal (the speaker) need not be one of the speakers used to train artificial intelligence tools 111-1 through 111-8. Apparatus 103b operates independently of the source of the input signal. Preprocessor 138 provides a feature set to artificial intelligence tools 111-1 through 111-8. Artificial intelligence tools 111-1 through 111-8 produce independent measures of the MOS for the system. Averaging circuit 140 averages the outputs of artificial intelligence tools 111-1 through 111-8. The output of averaging circuit 140 comprises a measure of the fidelity of the system.

Apparatus 103b can be used, for example, to improve the design process for vocoders and other elements of a telecommunications system. When a prototype vocoder, having an encoder and a decoder, is ready for testing, a speaker provides an input signal to the prototype vocoder. Apparatus 103b provides a measure of the fidelity of the prototype vocoder. Based on the output of apparatus 103b, the designer can modify the design of the prototype vocoder to improve the MOS test results. This procedure can be used iteratively until a satisfactory MOS output is achieved. Then the vocoder can be incorporated into, for example, a base station for a wireless communications system or a wireless terminal. For example, the encoder can be incorporated into the transmission circuit of a wireless terminal and the decoder can be incorporated into the receive circuit of the wireless terminal. It is noted that apparatus 103b operates independent of the technology of the system, the input signal provided to apparatus 103b and the speaker.

Although the present invention has been described in detail, it should be understood that various changes, substitutions and alteration may be made hereto without departing from the spirit and scope of the present invention as defined by the appended claims. For example, in FIG. 6, preprocessor 138 could be removed and the functionality incorporated into each artificial intelligence tool 111-1 through 111-8. Additionally, the number of artificial intelligence tools 111-N in FIG. 6 can be varied without departing from the spirit and scope of the invention. Furthermore, in FIG. 4, frame blockers 113 and 115 may generate either overlapping or non-overlapping frames.

What is claimed is:

1. A method for manufacturing a plurality of devices having a system, the method comprising:

designing a system;

extracting a feature set from an output signal of said system, said feature set corresponding to the fidelity of said system and based an differences between an input signal of said system and said output signal;

measuring the fidelity of the system with a neural network device trained in a relationship between feature sets of an input signal and fidelity measurements, said neural network generating an output fidelity measurement based upon said extracted feature set;

modifying the design of the system based on the output fidelity measurement;

extracting a new feature set from an output signal corresponding to the fidelity of said modified system;

measuring the fidelity of the modified system with the fidelity measuring apparatus to generate a modified output fidelity measurement;

repeating the steps of modifying, extracting, and measuring until an acceptable fidelity measurement is achieved; and incorporating the system determined to have the acceptable fidelity into the devices.

2. The method of claim 1, wherein said step of designing a system comprises the step of designing an encoder and a decoder for a wireless terminal.

3. The method of claim 2, wherein said step of incorporating the system comprises:

incorporating the encoder in a transmission circuit of the wireless terminal; and incorporating the decoder in a receive circuit of the wireless terminal.

4. The method of claim 1, wherein said step of measuring the fidelity comprises:

extracting a feature from an output signal generated by the system;

generating at least two intermediate measurements with at least two artificial intelligence networks that are independently trained by signals from different sources in a relationship between fidelity and the extracted feature; and averaging the intermediate measurements from the two artificial intelligence networks to produce a fidelity measurement for the system.

5. The method of claim 4, wherein at least one of said extracting steps comprises determining a power spectral distortion of the output signal and comparing said power spectral distortion of said output signal with a power spectral distortion of said input signal.

6. The method of claim 4, wherein said step of extracting a feature comprises generating a set of data representing said feature for a plurality of frequency bands.

7. The method of claim 4, wherein said step of generating at least two intermediate measurements comprises generating at least two measurements with at least two neural networks.

8. The method of claim 4, wherein said step of generating at least two intermediate measurements comprises generating at least two measurements with at least two multilayer perceptrons.

9. The method of claim 1, wherein said step of measuring the fidelity of the system comprises generating a mean opinion score.

10. A communications terminal comprising:
- a transmission circuit capable of receiving an original speech utterance;
- a receive circuit;
- a first system coupled to said transmission circuit for generating a first signal representing said original speech utterance, and a second, complementary system coupled to said receive circuit; and
- wherein a design of said first and second systems is adjusted in accordance with an output fidelity measurement made with a fidelity measuring apparatus that includes a preprocessor for extracting a feature set from said first signal corresponding to the fidelity of said first system, said feature set based on differences between said original speech utterance and said first signal, and one or more neural networks trained in a relationship between feature sets of an input signal and fidelity measurements, said one or more neural networks generating an output fidelity measurement based upon said extracted feature set.

11. The communications terminal of claim 10, wherein said fidelity measuring apparatus further comprises:
- at least two neural networks responsive to said extracted feature set that are trained in a relationship between fidelity and said extracted feature set and that generate at least two intermediate measurements; and
- an averaging circuit responsive to said neural networks that averages the intermediate measurements from the two neural networks to produce a fidelity measurement for said systems.

12. The communications terminal of claim 11, wherein said preprocessor comprises a circuit that determines a power spectral distortion of the signal generated by the systems.

13. The communications terminal of claim 11, wherein said preprocessor comprises a circuit that generates a set of data representing said feature for a plurality of frequency bands.

14. The communications terminal of claim 11, wherein said preprocessor comprises:
- a first circuit that processes an input signal;
- a second circuit that processes an output signal operated on by said first and second systems;
- said first and second circuits comprising substantially identical operations; and
- a comparison circuit that compares the output of said first and second circuits to extract the feature.

15. The communications terminal of claim 11, wherein said artificial intelligence tools comprise at least two multilayer perceptrons.

16. The communications terminal of claim 10, wherein said fidelity measuring apparatus generates a mean opinion score.

17. The communications terminal of claim 10 wherein said first and second systems comprise an encoder and a decoder for a wireless terminal.

* * * * *